W. G. CREAMER.
Basket Rack for Railroad Cars.
No. 92,174.
Patented July 6, 1869.
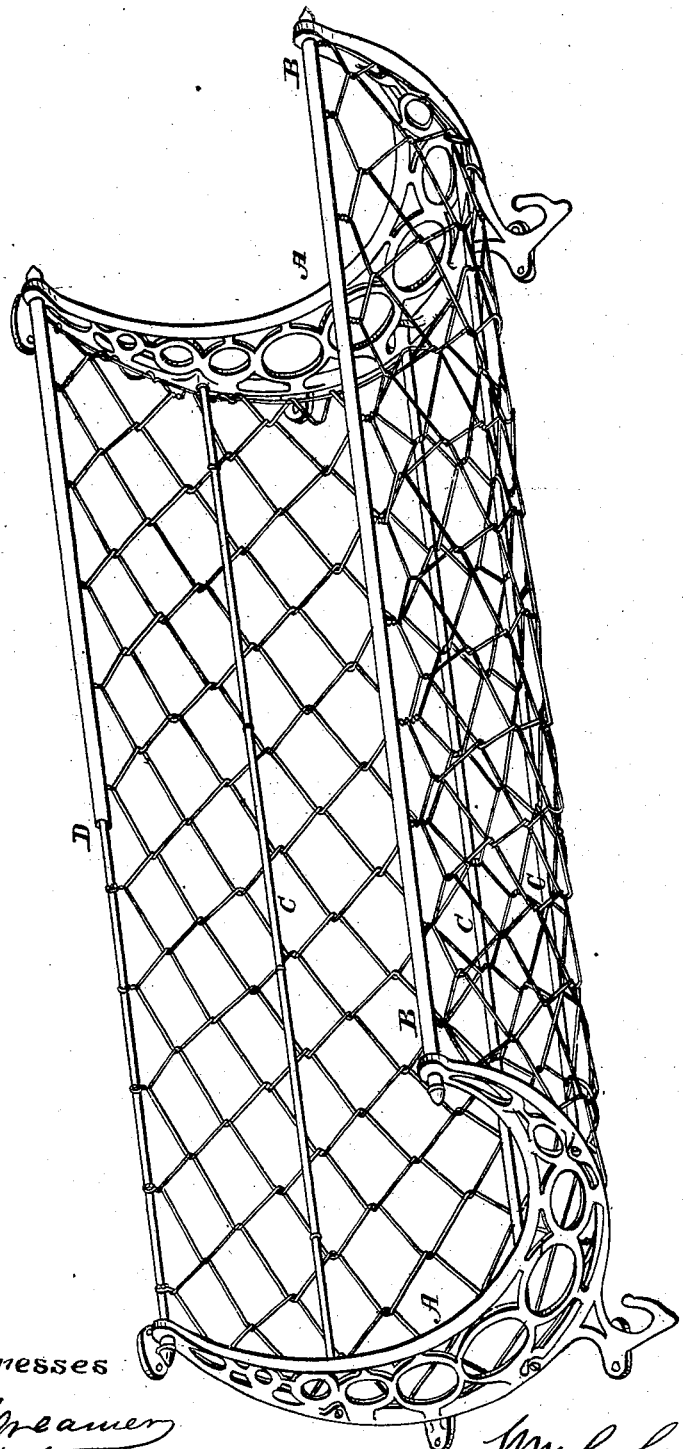
Witnesses
Inventor:

WILLIAM G. CREAMER, OF BROOKLYN, NEW YORK.

Letters Patent No. 92,174, dated July 6, 1869.

IMPROVED BASKET-RACK FOR RAILROAD-CARS.

The Schedule referred to in these Letters Patent and making part of the same.

*To all whom it may concern:*

Be it known that I, WILLIAM G. CREAMER, of the city of Brooklyn, county of Kings, State of New York, have invented a new and improved Mode of Constructing Basket-Racks for Railroad-Cars; and I do hereby declare that the following is a full, clear, and exact description of the same, reference being had to the accompanying drawings, and the letters of reference marked thereon.

The nature of my invention consists in covering the front and top rods, on which the netting is bound, with a tubular covering, for the purpose of making them smooth, and preventing the catching of shawls, or clothing, or bags, against the rough edges or projections caused by binding the ends of the wire on the rods.

To enable others skilled in the art to make and use my invention, I will proceed to describe its construction and operation.

I construct my basket-racks in the usual form, binding the netting on the rods in the usual way, making the front and top rods slightly longer than the others, and putting a screw on the ends.

I then make a tube, with a slot running the entire length, and just wide enough to pass the thickness of the netting.

I then form my netting up to the shape of the end brackets A A, and then put the rack together, the ends of the tubes B B B coming up to the shoulder of the brackets, and the nuts are screwed on, the inner rods C C C are screwed or riveted into the brackets, and the rack is then complete and ready to put up in the car.

On the top rod, from the end to D, the rod is shown uncovered in the usual way.

What I claim as my invention and improvement, is—

Covering the edges of the wire-work racks, for railroad-cars, with a slotted tubular covering, as shown and described.

WM. G. CREAMER.

Witnesses:
H. M. CREAMER,
F. A. WILCOXSON.